Jan. 3, 1956 K. WANDEL 2,729,145
DISINTEGRATING APPARATUS
Filed Aug. 12, 1952 2 Sheets-Sheet 1

INVENTOR
KURT WANDEL
BY
Pennie Edmonds Morton Barrows & Taylor
ATTORNEYS

Jan. 3, 1956  K. WANDEL  2,729,145
DISINTEGRATING APPARATUS
Filed Aug. 12, 1952  2 Sheets-Sheet 2
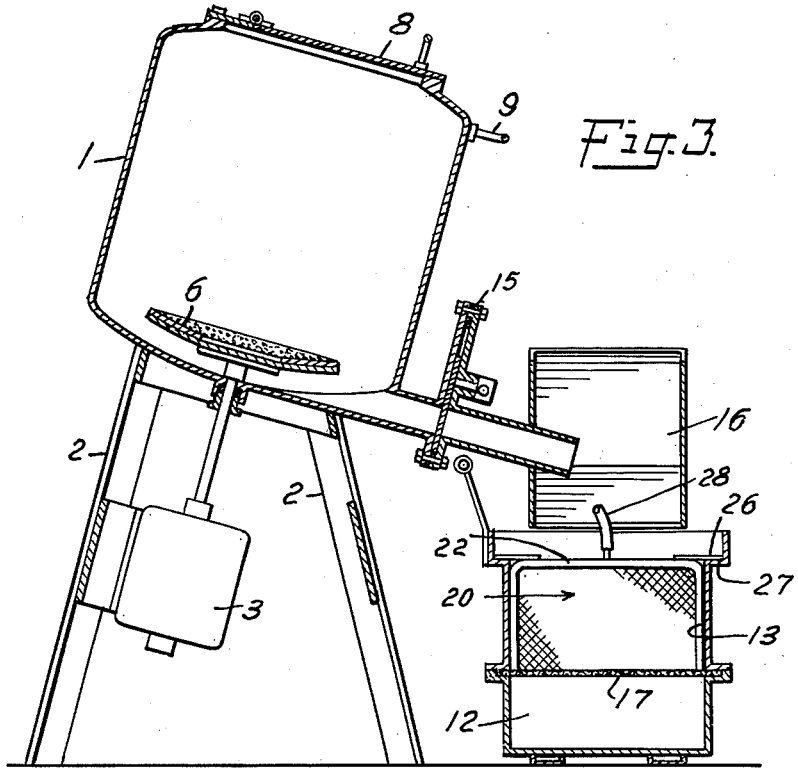
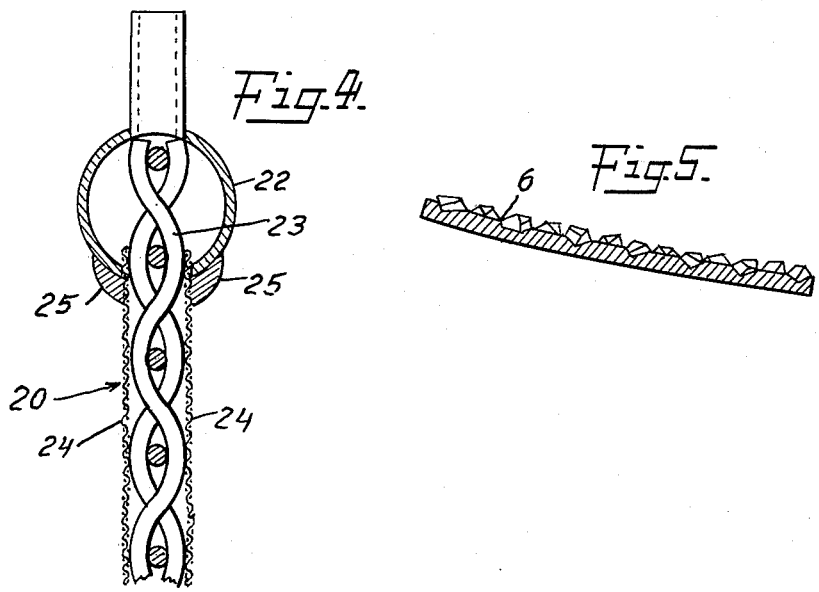
INVENTOR
KURT WANDEL
BY
Pennie, Edmonds, Morton, Barrows & Taylor
his ATTORNEYS

United States Patent Office 2,729,145
Patented Jan. 3, 1956

2,729,145

DISINTEGRATING APPARATUS

Kurt Wandel, Downingtown, Pa.

Application August 12, 1952, Serial No. 303,856

10 Claims. (Cl. 92—20)

Waste paper is largely used in the manufacture of paper board and molded paper pulp products such as pie plates and the like. In so using waste paper the paper is disintegrated by apparatus such as disclosed in my recently granted Patent No. 2,592,215 in the form of a water suspension which is made directly into paper or processed in the ordinary manner of paper pulp. This manner of using waste paper constitutes a manufacturing operation involving large plant facilities which require the collection of the paper from the various sources where such paper is accumulated, baling of the paper and transporting it to the paper or pulp works where it is reconverted into paper or pulp. Much of the paper so used is in the form of waste basket accumulations in offices, etc., and handling of waste paper from such sources often involves a greater expense than the ultimate paper pulp is worth. Such waste basket accumulations, however, must be disposed of even though considerable expense is entailed.

The object of the present invention is to provide an apparatus which can be installed in the basement of office buildings and the like where waste paper of this kind accumulates, which can be there used to reduce the paper to a marketable form of pulp with less labor than now required to bale or otherwise package the waste paper for shipment to the factories where such waste is used.

One of the advantages of an apparatus of this kind, which in many instances is of greater value than the economy effected in the disposal of the waste paper, is that the paper disposed of does not leave the building in a form where its original nature and possible contents in the way of writing, can be deciphered. In many offices, Government institutes, factories, etc. and the like, the work sheets of employees engaged in research work, deciphering codes, drafting and messages, etc. contain highly confidential matter, and in many such offices and institutes it is the practice to have such work sheets and the like burned by confidential employees rather than disposed of in the usual waste paper receptacles. This disposition of valuable documents also involves considerable cost and is besides an unsatisfactory method of disposing of waste paper.

With my improved apparatus the paper deposited in the apparatus is immediately destroyed as such so that if the documents are of a nature that they must be destroyed before leaving the hands of the parties entrusted with them, it is only necessary for such parties to deposit them in the apparatus and turn the switch, leaving the disintegrated pulp to be handled by others with no fear that any portion of the original sheets remains undestroyed.

In the accompanying drawings, I have illustrated a preferred embodiment of my improved apparatus, and in said drawings:

Fig. 3 is a vertical sectional view of the apparatus on line 3—3 of Fig. 1; and

Figs. 4 and 5 are detail views which will be later described.

Figure 1:
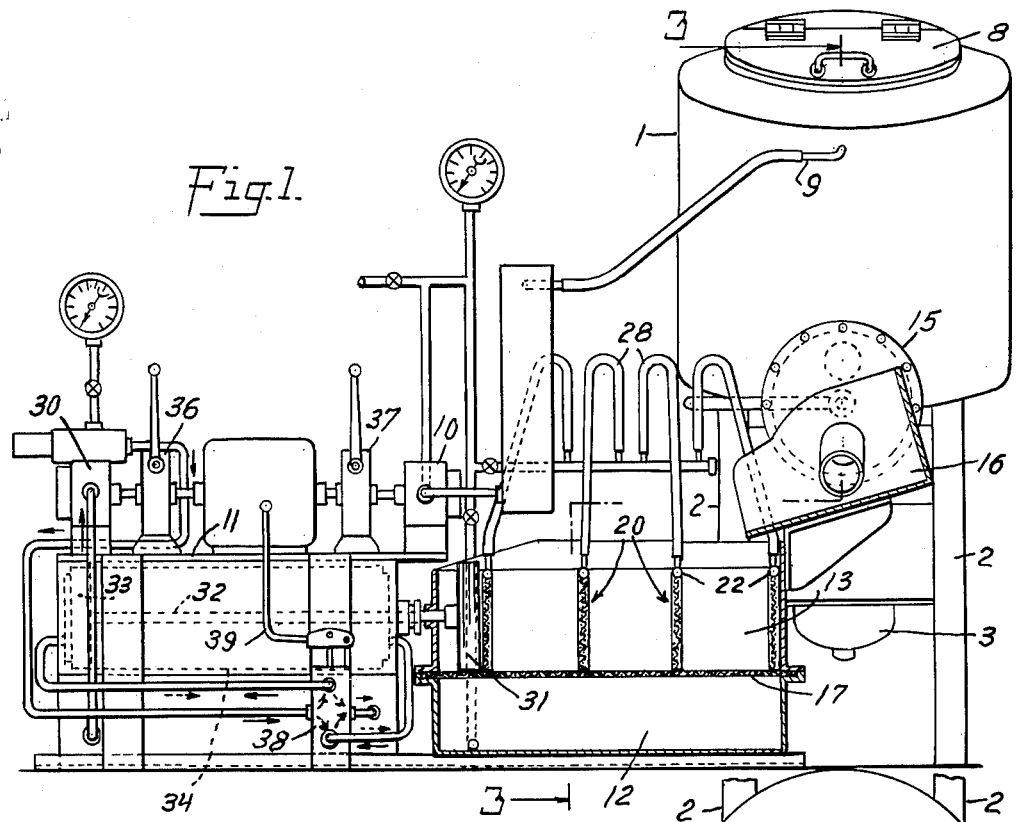
Fig. 1 is a side elevation of my improved apparatus.
Figure 2:
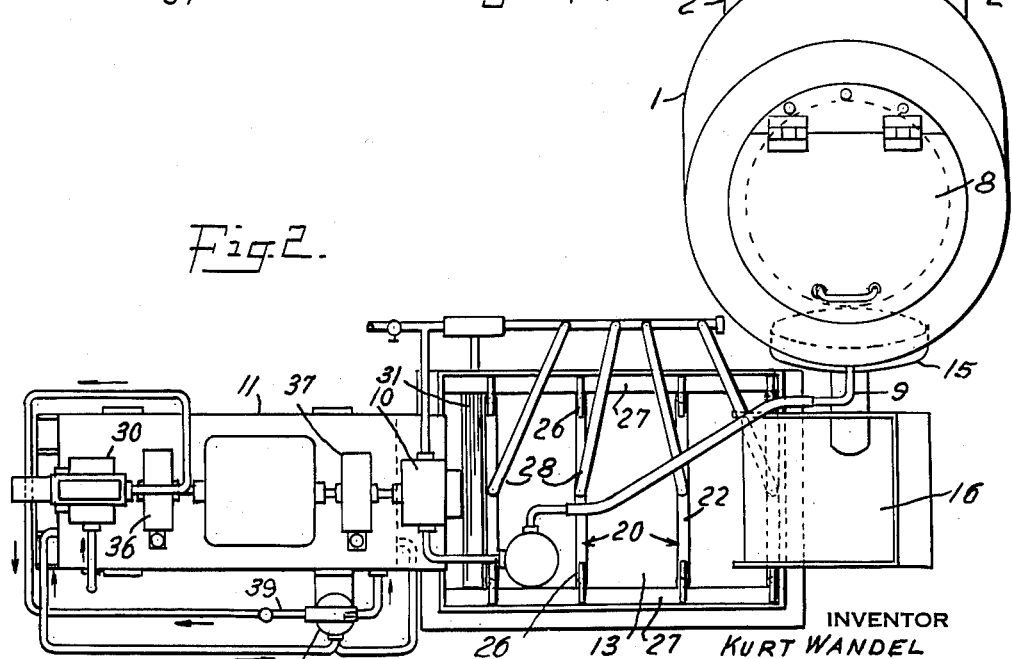
Fig. 2 is a plan view of the apparatus shown in Fig. 1.

Referring to the drawings, 1 indicates the tank of the apparatus which, as shown, is of generally cylindrical shape and supported with its axis inclined to the vertical at an angle of about 15°. Supported on the frame 2 upon which the tank is mounted is a driving motor 3 whose shaft extends through an axially positioned stuffing box on the under side of the tank. Attached to the end of the shaft within the tank is an impeller or disintegrating member 6 of the character disclosed in my co-pending application Serial No. 121,270, filed October 14, 1949, now Patent No. 2,641,165.

The impeller is spaced from the bottom of the tank in the manner shown and is preferably of a diameter equal to about two-thirds the diameter of the tank. The tank is provided with a hinged cover 8 through which the paper to be disposed of is deposited in the tank. It has been found that the positioning of the tank with its axis at an angle to the vertical in the order of 15° greatly increases the effectiveness of the impeller in disintegrating the paper. The angle of inclination is not sharply critical. An inclination of 45° gives better results than a horizontal arrangement or a vertical arrangement. The best results seem to be obtained when the inclination is sufficient to produce a distinctly greater flow toward the lower side. About 15° appears to give optimum results with the apparatus illustrated but changes in tank diameter, impeller diameter and speed of operation may require changes in the angle in order to secure optimum results. The tank is also provided with a pipe 9 through which the tank is charged with water by means of a pump 10 supported on a frame 11 alongside the frame which supports the tank. The pump 10 is connected at its suction side to a tank 12 underlying the frame 11 which should have a capacity about two-thirds the capacity of the tank 1, which furnishes a reservoir more than sufficient for one batch operation. The tank 12 is connected with the water supply of the building so that make-up water may be supplied to the system when necessary. Supported on the tank 12 is a press box 13 into which the disintegrated pulp is discharged from the tank 1. With an apparatus such as described a charge of paper is supplied to the tank 1 to which water is added through the pipe 9. The amount of water should be about ten times the weight of the paper. The depth of the charge should not be over two-thirds the height of the tank. The impeller is then set in motion and in a matter of three or four minutes the charge of paper will be reduced to an homogenous pulp suitable for use in the manufacture of paper board.

The pulp so formed is discharged from the tank through a gate valve 15 into a feed box 16 overlying the press box 13. The feed box is inclined as shown and the paper pulp flows into the press box which, as shown in Fig. 1, is separated from the tank 12 by a partition 17 formed of coarse screening with an overlying sheet of fine screening. After the box is filled with pulp to the desired level partition members 20 are placed at intervals in the pulp, the purpose of the partition members being to extract water from the pulp as it is compressed in the press box. These partition members, as shown in Fig. 4, consist of a three-sided rectangular frame formed of a piece of pipe 22, which pipe is slotted along its side to receive the edges of a sheet of heavy screening 23. On each side of the heavy screening 23 are sheets 24 of fine screening whose edges also project in the slots in the frames 22, the sheets 23 and 24 being firmly soldered or brazed to the adjacent edges of the pipe as shown at 25, the assembly forming a substantially rigid partition of two sheets of fine screening separated by the coarse screening and communicating throughout the top and side marginal edges of the sheets with the inside of the pipe 22.

Attached to the top corners of the rectangular frames 20 are pins 26 by means of which the partitions are supported on tracks 27 formed by offsets in the side walls of the press box 13. The pipes 22 at the middle of the upper sides of the frames are provided with hose connections 28 through which the various pipes 22 are connected to the suction side of the pump 10, suitable valves being provided so that the connection to the sump 12 can be cut off when the partitions are connected to the suction side of the pump.

The pump is driven by means of an electric motor mounted on the frame 11, which motor also serves to drive a second pump 30 for operating the piston 31 of the outer end of a piston rod 32 connected with a second piston 33 contained in a cylinder 34 supported on the under side of the top member of the frame 11 upon which are mounted the motor and pumps previously described. A clutch 36 connects one end of the motor shaft with the pump 32 which operates the press and a similar clutch 37 is employed for connecting the motor with the pump 10 which controls the supply of water to the tank 1. A control valve 38 with an operating handle 39 is provided for controlling the flow of liquid to opposite ends of the cylinder 34.

In operation the paper to be destroyed is charged into the tank 1 which already contains a substantial quantity of water previously extracted from the previous charge of pulp in the press box. Additional water is supplied to the tank 1 if necessary by the pump 10 until the required amount of water is in the tank. The impeller is then set in motion as described, and the paper reduced to a homogenous pulp. The charge of pulp is then drawn off into the tank 1 through the gate valve 15 and discharged into the press box. During this operation the several partitions may readily be lifted by hand to allow the pump to fill the press box to the desired height, which is slightly below the tracks 27 by means of which the partitions are supported. The partitions are replaced in the box with one at each end and the intermediate partitions spaced evenly between. In the drawing the four partitions are shown, but a greater number may advantageously be employed. After the press box is charged as described the clutch 37 is closed to start the suction pump in operation and the clutch 36 is also closed with the valve 38 set to shift the piston 33 and with it the press piston 31 toward the right as shown in Fig. 1 to thereby compress the pulp and squeeze the water out of it. During this operation the suction on the partitions serves to remove the water rapidly from the pulp and return the water to the tank 1 for reuse with the next charge of paper. As the charge of pulp is compressed in the press box the partitions are moved with the pulp toward the right of the box, operating continuously, however, to withdraw the water as it is squeezed out of the pulp. When the pulp is compressed to the desired degree the control valve 38 is shifted to reverse the connections between the pump 32 and the cylinder so that the liquid in the cylinder 33, which may be either oil or water, is pumped from the space behind the piston 33 to a space in front of the piston, thereby reversing the motion of the press plunger to release the pressure on the pulp.

When pressed in this manner the pulp expands very little on release of the pressure and the slabs of pulp thus formed between the partitions may be readily removed by hand and set aside for further drying. By the pressing operation above described the water content of the pulp is reduced to about 20% of the weight of the slab and the slabs are compact enough to be handled without danger of breaking apart. The slabs do not drip. In fact, they merely feel somewhat damp for the slight expansion of the pulp is enough to draw the free surface water into the pulp. The slabs so produced will dry in a matter of a few hours under ordinary atmospheric conditions to substantial dryness and will have all the strength and rigidity of a molded paper block which can be shipped in bulk in the same way as lumber or like commodities without baling or otherwise packaging.

In the foregoing specification and accompanying drawings I have illustrated my improved machine in the form in which it is now manufactured, but it will be understood that the invention is not limited to the particular structure therein disclosed except insofar as covered by the appended claims.

I claim:

1. A self-contained apparatus for destroying waste paper and restoring it to self-sustaining, solid form consisting of a unit for disintegrating waste paper in the presence of water to form an aqueous suspension of cellulose fibers, a press box, means for delivering the suspension to said box, means for pressing the suspension in said box, means for extracting water from said suspension comprising a hollow member having a foraminous face in contact with said pulp during the pressing operation, and means for applying suction to the interior of said hollow member.

2. A self-contained apparatus for destroying waste paper and restoring it to self-sustaining, solid form consisting of a unit for disintegrating waste paper in the presence of water to form an aqueous suspension of cellulose fibers, a press box, means for delivering the suspension to said box, a movable member for pressing the suspension in said box, means for extracting water from said suspension comprising a movable hollow member having a foraminous face in contact with said pulp during the pressing operation, and means for applying suction to the interior of said hollow member.

3. A self-contained apparatus for destroying waste paper and restoring it to self-sustaining, solid form consisting of a unit for disintegrating waste paper in the presence of water to form an aqueous suspension of cellulose fibers, a press box, means for delivering the suspension to said box, a movable member for pressing the suspension in said box, means for extracting water from said suspension comprising a plurality of movable hollow partition members having foraminous faces in contact with said pulp during the pressing operation, and means for applying suction to the interior of said hollow members.

4. A self-contained apparatus for destroying waste paper and restoring it to self-sustaining, solid form consisting of a unit for disintegrating waste paper in the presence of water to form an aqueous suspension of cellulose fibers, a press box for extracting water from said suspension and means for returning the water to the disintegrating means as it is extracted.

5. A self-contained apparatus for destroying waste paper and restoring it to self-sustaining, solid form consisting of a unit for disintegrating waste paper in the presence of water to form an aqueous suspension of cellulose fibers, a press box, means for delivering the suspension to said box, means for pressing the suspension in said box, means for extracting water from said suspension comprising a hollow member having a foraminous face in contact with said pulp during the pressing operation, and a pump having its suction side connected to said member and its pressure side to said disintegrating apparatus.

6. Disintegrating apparatus comprising a vat of generally cylindrical form, means for supporting said vat with its axis inclined to the vertical at an angle not exceeding 45°, and an impeller supported adjacent the bottom of said vat for rotation about an axis coincident with the axis of said vat.

7. Disintegrating apparatus comprising a vat of generally cylindrical form, means for supporting said vat with its axis inclined to the vertical at an angle of substantially 15°, and an impeller supported adjacent the bottom of said vat for rotation about an axis coincident with the axis of said vat.

8. Disintegrating apparatus comprising a vat of generally cylindrical form, means for supporting said vat with its axis inclined to the vertical at an angle not exceeding 45°, and an impeller supported adjacent the bottom of said vat for rotation about an axis coincident with the axis of said vat, said impeller comprising a disk spaced from the end of said vat with the marginal portion of its surface covered with discreet particles of a crystal line abrasive.

9. Disintegrating apparatus comprising a vat of generally cylindrical form, means for supporting said vat with its axis inclined to the vertical at an angle of substantially 15°, and an impeller supported adjacent the bottom of said vat for rotation about an axis coincident with the axis of said vat, said impeller comprising a disk spaced from the end of said vat with the marginal portion of its surface covered with discreet particles of a crystalline abrasive.

10. Disintegrating apparatus comprising a vat of generally cylindrical form, means for supporting said vat with its axis inclined to the vertical at an angle of substantially 15°, and an impeller supported adjacent the bottom of said vat for rotation about an axis coincident with the axis of said vat, said impeller comprising a concave disk spaced from the end of said vat with the marginal portion of its surface covered with discreet particles of a crystalline abrasive.

References Cited in the file of this patent

UNITED STATES PATENTS

| | | |
|---|---|---|
| 1,277,737 | Lefebvre | Sept. 3, 1918 |
| 1,861,933 | Murdock | June 7, 1932 |
| 1,873,585 | Harvey | Aug. 23, 1932 |
| 2,053,570 | MacMillin | Sept. 8, 1936 |
| 2,336,798 | Nash | Dec. 14, 1943 |
| 2,468,296 | Jacobowitz et al | Apr. 26, 1949 |
| 2,592,215 | Wandel | Apr. 8, 1952 |
| 2,616,340 | Knoll | Nov. 4, 1952 |

FOREIGN PATENTS

| | | |
|---|---|---|
| 2,859 | Great Britain | 1903 |